United States Patent
Chan et al.

[11] Patent Number: 5,956,409
[45] Date of Patent: Sep. 21, 1999

[54] SECURE APPLICATION OF SEALS

[75] Inventors: Chih S. Chan, Saratoga; Mohamed A. Moussa, Sunnyvale, both of Calif.

[73] Assignee: Quintet, Inc., Cupertino, Calif.

[21] Appl. No.: 08/641,104

[22] Filed: Apr. 29, 1996

[51] Int. Cl.$^6$ .................................................... H04L 9/00

[52] U.S. Cl. ................................ 380/54; 380/4; 380/9; 380/23; 380/25; 380/44; 380/49; 380/50; 380/51; 380/55

[58] Field of Search ............................. 380/4, 9, 21, 23, 380/25, 44, 45, 46, 49, 50, 51, 54, 55, 59; 340/825.31, 825.34; 382/115, 116, 117, 118, 119, 120, 121, 122, 123, 124, 125, 126, 127; 902/1, 2, 3, 4, 5, 6

[56] References Cited

U.S. PATENT DOCUMENTS

| Re. 34,161 | 1/1993 | Nakagawa et al. | 273/85 G |
|---|---|---|---|
| 3,906,444 | 9/1975 | Crane et al. | 340/140.3 |
| 3,956,734 | 5/1976 | Radcliffe | 340/146.3 |
| 3,983,535 | 9/1976 | Herbst et al. | 340/146.3 |
| 3,991,402 | 11/1976 | Radcliffe | 340/146.3 |
| 4,005,878 | 2/1977 | Van Leer | 238/8 R |
| 4,028,674 | 6/1977 | Chuang | 340/146.3 |
| 4,078,226 | 3/1978 | EerNisse et al. | 340/146.3 |
| 4,111,052 | 9/1978 | Sniderman et al. | 73/432 R |
| 4,128,829 | 12/1978 | Herbst et al. | 340/146.3 |
| 4,143,357 | 3/1979 | Baver et al. | 340/146.3 |
| 4,190,820 | 2/1980 | Crane et al. | 340/146.3 |
| 4,201,978 | 5/1980 | Nally | 340/146.3 |
| 4,202,626 | 5/1980 | Mayer et al. | 355/52 |

(List continued on next page.)

FOREIGN PATENT DOCUMENTS

| 0 281 224 | 1/1988 | European Pat. Off. . |
| WO 95/16974 | 6/1995 | WIPO . |

OTHER PUBLICATIONS

Lam, et al., Signature Recognition Through Spectral Analysis, 1989, 1023 Pattern Recognition, pp. 39–44.

Sato, et al., Online Signature Verification Based on Shape, Motion, and Writing Pressure, 1982, Proc. 6Th Int. Conf. On Pattern Recognition, pp. 823–826.

Liu, IBM Technical Disclosure Bulletin, Reference Design Procedure for Signature Verification, Jun. 1978, vol. 21, No. 1, pp. 426–427.

"Chinese Seals: Business and Art"; by J. F. Keating; Vision International Publishing Co., Taipei, Taiwan; http://www.sinica.edu.tw/tit/arts/0496 _Seals.html, 1995.

"Seals (Yinzhang)"; by Du Feibao; Xindeco Business Information Company; no city given; http://www.chinavista.com/experience/seal/seals.html., 1998.

*Primary Examiner*—Bernarr E. Gregory
*Attorney, Agent, or Firm*—Steven A. Swernofsky

[57] ABSTRACT

The invention provides a method of and system for secure application of seals. An optical image of a seal is recorded by a computer and encrypted using a key for encryption generated in response to template biometric data from authorized persons. When a person seeks to use the seal, for example to apply the seal to a document, test biometric data is input from that person and used to generate a key for decryption. If the test biometric data matches the template biometric data, the key for decryption will be useful for decrypting the encrypted seal, and the person seeking access to the seal. The test biometric data represents a handwritten signature given contemporaneously by the person seeking access, and is verified against a set of template signatures earlier given by at least one authorized person. Specific signature features are determined in response to the template signatures and used for generating one or more keys for encrypting the seal. Similarly, specific signature features are determined in response to the test signature and used for generating keys for decrypting the seal. Features are embedded in the optical image of the seal, or in the printed seal in the event that the document is physically printed, which demonstrate to a person examining the document that the seal is genuine. These features include microembedding of biometric data or specific features determined in response thereto.

11 Claims, 2 Drawing Sheets

U.S. PATENT DOCUMENTS

| | | | |
|---|---|---|---|
| 4,216,374 | 8/1980 | Fluke | 371/27 |
| 4,221,063 | 9/1980 | Charles et al. | 40/21 C |
| 4,240,065 | 12/1980 | Howbrook et al. | 340/146.3 |
| 4,264,782 | 4/1981 | Konheim | 178/22 |
| 4,281,313 | 7/1981 | Boldridge et al. | 340/146.3 |
| 4,285,146 | 8/1981 | Charles et al. | 40/21 C |
| 4,286,255 | 8/1981 | Siy | 340/146.3 |
| 4,308,522 | 12/1981 | Paganini et al. | 340/146.3 |
| 4,326,098 | 4/1982 | Bouricius | 178/22.08 |
| 4,345,239 | 8/1982 | Elliott | 340/146.3 |
| 4,433,436 | 2/1984 | Carnes | 382/3 |
| 4,475,235 | 10/1984 | Graham | 382/3 |
| 4,495,644 | 1/1985 | Parks et al. | 382/3 |
| 4,513,437 | 4/1985 | Chainer et al. | 382/3 |
| 4,536,746 | 8/1985 | Gobeli | 340/365 A |
| 4,553,258 | 11/1985 | Chainer et al. | 382/3 |
| 4,553,259 | 11/1985 | Chainer et al. | 382/3 |
| 4,562,592 | 12/1985 | Chainer et al. | 382/3 |
| 4,581,482 | 4/1986 | Rothfjell | 128/18 |
| 4,595,924 | 6/1986 | Gehman | 343/5 PD |
| 4,633,436 | 12/1986 | Flurry | 364/900 |
| 4,641,146 | 2/1987 | Gehman | 343/814 |
| 4,641,354 | 2/1987 | Fukunaga et al. | 382/13 |
| 4,646,351 | 2/1987 | Asbo et al. | 382/13 |
| 4,653,097 | 3/1987 | Watanabe et al. | 381/42 |
| 4,653,107 | 3/1987 | Shojima et al. | 382/13 |
| 4,680,801 | 7/1987 | Etherington et al. | 382/3 |
| 4,691,355 | 9/1987 | Wirstrom et al. | 380/23 |
| 4,694,492 | 9/1987 | Wirstrom et al. | 380/23 |
| 4,701,960 | 10/1987 | Scott | 382/3 |
| 4,718,102 | 1/1988 | Crane et al. | 382/13 |
| 4,720,860 | 1/1988 | Weiss | 380/23 |
| 4,724,542 | 2/1988 | Williford | 382/3 |
| 4,727,588 | 2/1988 | Fox et al. | 382/13 |
| 4,736,445 | 4/1988 | Gundersen | 382/3 |
| 4,752,965 | 6/1988 | Dunkley | 382/3 |
| 4,759,073 | 7/1988 | Shah et al. | 382/8 |
| 4,776,020 | 10/1988 | Kosaka et al. | 382/1 |
| 4,789,934 | 12/1988 | Gundersen et al. | 364/419 |
| 4,791,343 | 12/1988 | Ahrendt | 318/696 |
| 4,797,672 | 1/1989 | Kousa | 340/825.3 |
| 4,799,258 | 1/1989 | Davies | 380/21 |
| 4,800,590 | 1/1989 | Vaughan | 380/25 |
| 4,856,062 | 8/1989 | Weiss | 380/23 |
| 4,856,077 | 8/1989 | Rothfjell | 382/3 |
| 4,860,372 | 8/1989 | Kuzunuki et al. | 382/13 |
| 4,881,264 | 11/1989 | Merkle | 380/25 |
| 4,897,867 | 1/1990 | Foster et al. | 379/94 |
| 4,901,358 | 2/1990 | Bechet | 382/3 |
| 4,903,991 | 2/1990 | Wright | 283/95 |
| 4,905,143 | 2/1990 | Takahashi et al. | 364/200 |
| 4,910,525 | 3/1990 | Stulken | 342/418 |
| 4,918,733 | 4/1990 | Daugherty | 381/43 |
| 4,963,859 | 10/1990 | Parks | 340/712 |
| 4,969,189 | 11/1990 | Ohta et al. | 380/25 |
| 4,972,562 | 11/1990 | Tanaka et al. | 28/190 |
| 4,991,205 | 2/1991 | Lemelson | 380/5 |
| 4,993,068 | 2/1991 | Piosenka et al. | 380/23 |
| 5,005,200 | 4/1991 | Fischer | 380/30 |
| 5,005,205 | 4/1991 | Ellozy et al. | 382/3 |
| 5,012,521 | 4/1991 | Endo et al. | 382/1 |
| 5,013,874 | 5/1991 | de Bruyne et al. | 178/18 |
| 5,018,208 | 5/1991 | Gladstone | 382/3 |
| 5,019,975 | 5/1991 | Berger et al. | 382/56 |
| 5,022,086 | 6/1991 | Crane et al. | 382/2 |
| 5,025,491 | 6/1991 | Tsuchiya et al. | 340/825.52 |
| 5,027,414 | 6/1991 | Hilton | 382/3 |
| 5,040,215 | 8/1991 | Amano et al. | 381/43 |
| 5,040,222 | 8/1991 | Muroya | 382/3 |
| 5,042,073 | 8/1991 | Collot et al. | 382/3 |
| 5,046,109 | 9/1991 | Basehore | 364/513 |
| 5,054,088 | 10/1991 | Gunderson et al. | 382/3 |
| 5,073,939 | 12/1991 | Vensko et al. | 381/43 |
| 5,097,505 | 3/1992 | Weiss | 380/23 |
| 5,103,486 | 4/1992 | Grippi | 382/4 |
| 5,107,541 | 4/1992 | Hilton | 382/3 |
| 5,109,426 | 4/1992 | Parks | 382/3 |
| 5,111,004 | 5/1992 | Gullman | 178/18 |
| 5,111,512 | 5/1992 | Fan et al. | 382/3 |
| 5,121,442 | 6/1992 | Togawa et al. | 382/13 |
| 5,131,055 | 7/1992 | Chao | 382/32 |
| 5,136,590 | 8/1992 | Polstra et al. | 371/16.2 |
| 5,138,889 | 8/1992 | Conrad | 73/863.12 |
| 5,159,321 | 10/1992 | Masaki et al. | 340/706 |
| 5,164,988 | 11/1992 | Matyas et al. | 382/25 |
| 5,168,520 | 12/1992 | Weiss | 380/23 |
| 5,177,789 | 1/1993 | Covert | 380/23 |
| 5,199,068 | 3/1993 | Cox | 380/23 |
| 5,202,930 | 4/1993 | Livshitz et al. | 382/3 |
| 5,226,809 | 7/1993 | Franco | 24/704.1 |
| 5,237,408 | 8/1993 | Blum et al. | 358/108 |
| 5,237,614 | 8/1993 | Weiss | 380/23 |
| 5,251,265 | 10/1993 | Döhle et al. | 382/3 |
| 5,257,320 | 10/1993 | Etherington et al. | 382/3 |
| 5,285,506 | 2/1994 | Crooks et al. | 382/13 |
| 5,299,269 | 3/1994 | Gaborski et al. | 382/9 |
| 5,341,422 | 8/1994 | Blackledge, Jr. et al. | 380/4 |
| 5,355,420 | 10/1994 | Bloomberg et al. | 382/46 |
| 5,361,062 | 11/1994 | Weiss et al. | 340/825.33 |
| 5,365,598 | 11/1994 | Sklarew | 382/13 |
| 5,371,797 | 12/1994 | Bocinsky, Jr. | 380/24 |
| 5,373,559 | 12/1994 | Kaufman et al. | 380/30 |
| 5,389,745 | 2/1995 | Sakamoto | 178/18 |
| 5,397,865 | 3/1995 | Park | 178/18 |
| 5,410,492 | 4/1995 | Gross et al. | 364/492 |
| 5,414,833 | 5/1995 | Hershey et al. | 395/575 |
| 5,422,959 | 6/1995 | Lee | 382/119 |
| 5,450,491 | 9/1995 | McNair | 380/25 |
| 5,455,892 | 10/1995 | Minot et al. | 395/23 |
| 5,459,675 | 10/1995 | Gross et al. | 364/492 |
| 5,461,924 | 10/1995 | Calderara et al. | 73/786 |
| 5,469,506 | 11/1995 | Berson et al. | 380/23 |
| 5,475,401 | 12/1995 | Verrier et al. | 345/179 |
| 5,479,531 | 12/1995 | Webster | 382/119 |
| 5,481,611 | 1/1996 | Owens et al. | 380/25 |
| 5,485,519 | 1/1996 | Weiss | 380/23 |
| 5,491,752 | 2/1996 | Kaufman et al. | 380/30 |
| 5,508,687 | 4/1996 | Gebhardt et al. | 340/825.31 |
| 5,517,578 | 5/1996 | Altman et al. | 382/181 |
| 5,537,489 | 7/1996 | Sinden et al. | 382/187 |
| 5,559,895 | 9/1996 | Lee et al. | 382/119 |

SECURE APPLICATION OF SEALS

BACKGROUND OF THE INVENTION

1. Field of the Invention

This invention relates to a method of, and system for, secure application of seals.

2. Description of Related Art

In some cultures and business environments, the preferred indicator of approval of a document is not a signature, but is instead a seal, sometimes known as a "chop". Typically this seal is a physical object which has a pattern embossed at one end, so that a person may ink the seal with a stamp pad and print a copy of the seal on a document.

When an office maintains a large number of documents, it is sometimes desirable to keep those documents in a "paperless" format, such as an optical image of what the document would look like if printed. The original document image may be generated by optically scanning a paper document, by generating and storing a print image of the document, or by generating and storing data for a document which is to be displayed on demand as a form.

One problem has arisen in the art is that it is impossible to impress the physical seal on a document which is not printed, i.e., on an optical document image. A related problem is that if an optical image of the seal is added to the document, using digital imaging techniques or other related techniques, a viewer of the document has substantially less confidence in the seal itself. This is because, unlike a physical seal, which can be kept physically secure by an authorized individual or a set of authorized individuals, an optical image of a seal might be applied by anyone who can achieve access to the necessary software for doing so.

Accordingly, it would be advantageous to provide a method in which application of seals to optical document images is both convenient and secure.

SUMMARY OF THE INVENTION

The invention provides a method of and system for secure application of seals. An optical image of a seal is recorded by a computer and encrypted using a key for encryption generated in response to template biometric data from authorized persons. When a person seeks to use the seal, for example to apply the seal to a document, test biometric data is input from that person and used to generate a key for decryption. If the test biometric data matches the template biometric data, the key for decryption will be useful for decrypting the encrypted seal, and the person seeking access to the seal.

In a preferred embodiment, the test biometric data represents a handwritten signature given contemporaneously by the person seeking access, and is verified against a set of template signatures earlier given by at least one authorized person. However, in alternative embodiments, the biometric data may represent facial images, fingerprints, hand images or handprints, foot images or footprints, human genome data, retinal images, voiceprints, recorded spoken statements, or other biometric data, or any arbitrary data which is particular to the authorized persons or the person seeking access. In a preferred embodiment, specific signature features are determined in response to the template signatures and used for generating one or more keys for encrypting the seal. Similarly, specific signature features are determined in response to the test signature and used for generating keys for decrypting the seal.

In a preferred embodiment, features are embedded in the optical image of the seal, or in the printed seal in the event that the document is physically printed, which demonstrate to a person examining the document that the seal is genuine. Preferably, these features include microembedding of biometric data or specific features determined in response thereto.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using one or more general purpose computers operating under program control, and that modification of general purpose computers to implement the process steps and data structures described herein would not require undue invention.

SECURE APPLICATION OF SEALS

Figure 1:
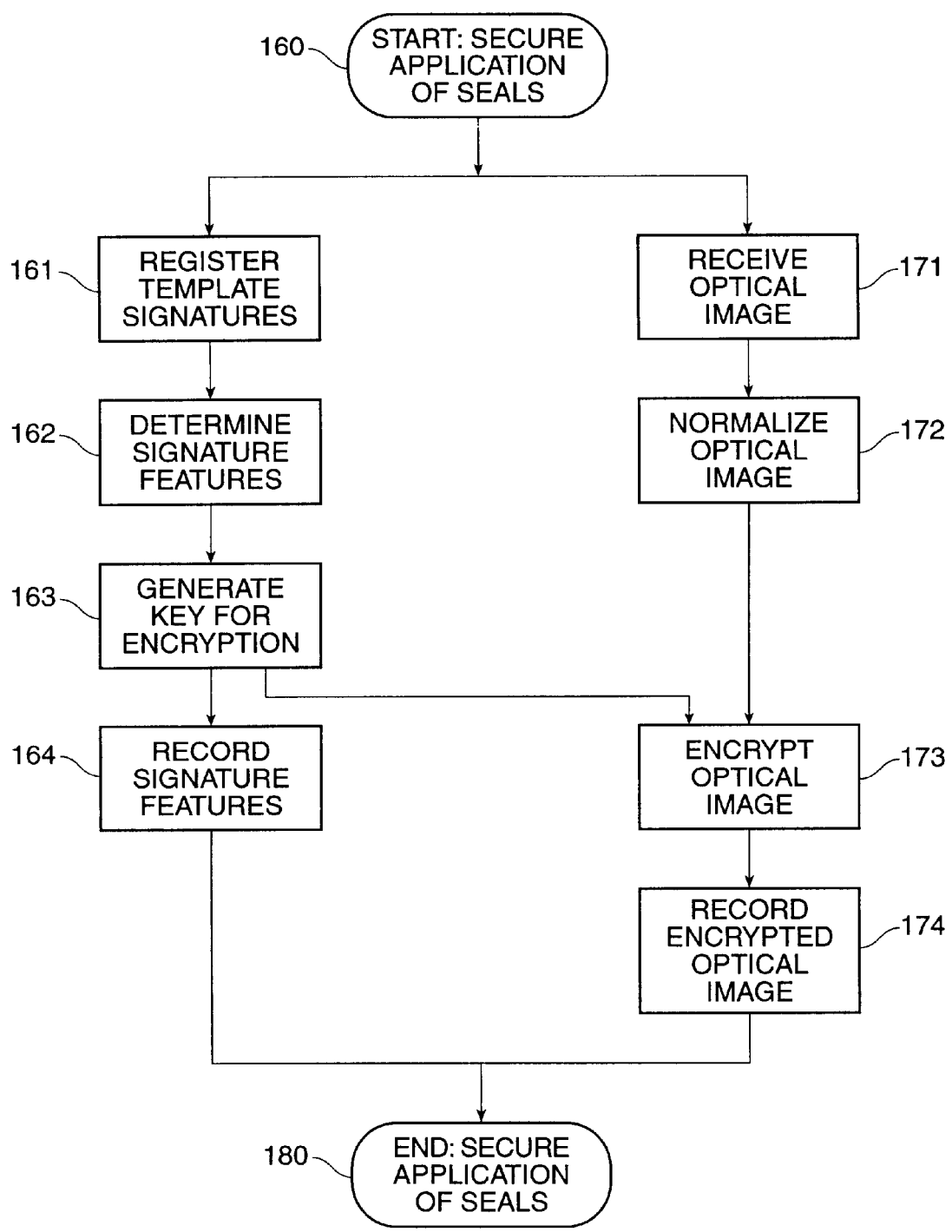
FIG. 1 shows a flow diagram of a method for secure application of seals.

FIG. 1 shows a flow diagram of a method for secure application of seals.

A system 100 for secure application of seals comprises a pen tablet 110 for receiving handwritten template signatures and test signatures 111, a processor 120 with program and data memory, and mass storage, for performing the steps of a method 150 for secure application of seals, a scanner 130 for receiving an optical image of a seal 131, such as printed by the seal 131 on paper 132, and a database 140 for recording information about handwritten template signatures 111 and for recording optical images of seals.

In a preferred embodiment, the pen tablet 110 comprises a Wacom pen tablet and associated pen having a writing surface of about 4 inches deep by about 6 inches wide and generating digital signals representing handwritten characters with a resolution of about 300 pixels per inch, the processor 120 comprises an IBM-PC-compatible computer, including an Intel x86 processor, 8 MB RAM, and a magnetic disk, the scanner 130 comprises the "ScanJet 3p" product, made by Hewlett-Packard of Palo Alto, Calif., disposed to provide output in ".gif" format, ".pcx" format, ".tiff" format, or other formats, and the database 140 is recorded on mass storage and in data memory for the processor 120, all operating under control of an application program which performs the method 150 described herein under supervision of operating system software such as Microsoft Windows 3.1 or MS-DOS.

However, in alternative embodiments, the method 150 could be performed by other types of pen tables 110, processors 120, scanners 130, or databases 140, or by application software under supervision of other operating system software. Implementing the method 150 with such other hardware would not require undue experimentation; such implementation would be within the scope and spirit of the invention.

A method 150 is conducted by the system 100. At a flow point 160 for the method 150, one or more authorized persons desire to register a seal 131 for application to a document.

From the flow point 160, the processor 120 performs the steps 161 through 164 in parallel with the steps 171 through 174.

At a step 161, one or more authorized persons registers a set of template signatures 111 using the pen tablet 110. In a preferred embodiment, the seal 131 will be associated with a single authorized person, just as the printed seal 131 is associated with a single person. However, in alternative embodiments, the seal 131 might be associated with more than one authorized person, such as the alternatives shown in table 1-1.

Table 1-1.

any one of a selected plurality of authorized persons is authorized to apply the seal;

all of a selected plurality of authorized persons are required to apply the seal; or any two (or any three, etc.) of a selected plurality of authorized persons are required to apply the seal.

At a step 162, the processor 120 determines a set of signature features in response to the template signatures 111. In a preferred embodiment, the processor 120 uses a method for determining signature features such as those described with a method of signature verification shown in the following disclosures:

Application Ser. No. 08/169,654, filed Dec. 17, 1993, in the name of inventors Ali Mohamed Moussa and Chih Chan, titled "Method for Automatic Signature Verification", assigned to the same assignee, and having attorney docket number ACS-001, now abandoned; and Application Ser. No. 08/483,942, filed Jun. 7, 1995, in the name of inventors Ali Mohamed Moussa and Chih Chan, titled "Method for Automatic Signature Verification", assigned to the same assignee, and having attorney docket number ACS-002, now U.S. Pat. No. 5,680,470.

Each of these applications is hereby incorporated by reference as if fully set forth herein. There are collectively referred to herein as the Signature Verification Disclosures.

At a step 163, the processor 120 generates a key for encryption in response to the signature features.

In a preferred embodiment the signature features comprise a set of about 300 bytes, as described in the Signature Verification Disclosures. A predetermined set of 56 bits are selected from these 300 bytes to form the key for encryption. In alternative embodiments, a different size set of bits, such as a set of 40 bits, may be selected. In further alternative embodiments, the set of bits selected may be, rather than predetermined, responsive to a deterministic variable, such as the time the seal is registered with the system.

At a step 164, the processor 120 records the signature features using the database 140.

In alternative embodiments, the key for encryption could be generated in response to other biometric data, or other features determined in response to the template signatures 111. For example, such other biometric data may comprise all or a selected part of, or an encoding of, a set of biometric information about a person, which biometric information may comprise a facial image, a fingerprint, a hand image or handprint, a foot image or footprint, a human genome or related genetic information, a retinal image, a voiceprint or other record of a spoken statement, or alternatively any other biometric information which is substantially unique to a first selected individual and difficult to adapt to a second selected individual. Biometric information differs from memorized information such as a password. Authentication using biometric information differs from physical forms of authentication such as using a pass key.

From the flow point 150, in parallel with the steps 161 through 164, the processor 120 also performs the steps 171 through 174.

At a step 171, the processor 120 receives an optical image of the seal 131. In a preferred embodiment, the seal 131 is impressed or otherwise printed on paper 132 and the paper 132 is input to the scanner 130 for generating an optical image to be used by the processor 120. The processor 120 records the optical image of the seal 131 in the database 140.

In a preferred embodiment, the optical image is an image file in an optical image format, such as the ".gif" format, ".pcx" format, ".tiff" format, or other formats. These formats are known in the art of digital image storage. The processor 120 receives data for the image file from the scanner 130 and generates the image file using driver software coupled to the scanner 130. In a preferred embodiment, an application software program generates a boundary for the optical image, such as by surrounding the optical image by a black border or a border having another uniform color.

In a preferred embodiment, a location for the border is selected by an operator, or alternatively, the following sub-steps are performed for generating the border:

At a sub-step 171-1, a box is drawn which encloses the entire seal, and possibly some extra whitespace.

At a sub-step 171-2, the box is reduced in size until it reaches the first nonblank pixel of the seal. Isolated nonblank pixels, or nonblank pixels having less than a selected density, are ignored, so that elements of noise introduced by printing or scanning the seal are disregarded.

At a sub-step 171-3, a center point of the box is located, responsive to the locations of the borders of the box.

At a sub-step 171-4, the seal is rotated slightly and it is determined if the box may be reduced further in size. If so, sub-steps 171-2, 171-3, and 171-4 are repeated until it is no longer possible to rotate the seal to a position where the box may be reduced further in size.

At a sub-step 171-5, the border is located at the borders of the box.

There is no particular requirement that the optical image must be generated using the physical seal 131. In alternative embodiments, the optical image may be generated by an application program for manipulating image files, such as the "Photoshop" application program available from Adobe Software, or may be generated by another application program, such as an application program for making "presentation" graphics such as the "Powerpoint" application program available from Microsoft Corporation of Redmond, Wash.

Moreover, physical seals are not always perfectly flat, and even when flat, are not always applied perfectly to the printing surface. Accordingly, areas of the physical seal may be only lightly printed or may be missing altogether. Accordingly, it is generally desirable to "touch up" the optical image of the seal before that image is registered with the system, using an application program for manipulating image files. In a preferred embodiment, such an application program is used to rotate and scale the optical image, and to digitally filter the optical image to remove elements of noise or other artifacts of printing or scanning the physical seal.

In further alternative embodiments, the optical image may be received by the processor 120 in an image file format from another source, such as image file data which has been recorded on a magnetic medium and coupled to the processor 120.

In further alternative embodiments, the processor 120 may receive data for the image file from the scanner 130 using an image other than one generated using the physical seal 131. For example, the image file may be generated using one or more photographs, such as a photograph of one or more authorized persons, a map, a hand-drawn stylized graphic, a set of hand-printed or handwritten text (possibly including a handwritten signature), printed text (possibly including a password), or other information such as information gleaned from a database.

At a step 172, the processor 120 normalizes the optical image of the seal 131. To perform this step 172, the processor 120 performs the following sub-steps:

- At a sub-step 172-1, the optical image is low-pass filtered to remove noise. Low-pass filtering is known in the art of image processing. In a preferred embodiment, the scanner 130 may perform this sub-step 172-1.
- At a sub-step 172-2, the optical image is edge-filtered to remove blurring at edges of structures therein. Edge filtering is known in the art of image processing. In a preferred embodiment, the scanner 130 may perform this sub-step 172-2.
- At a sub-step 172-3, a baseline is identified for the optical image, and the optical image is rotated to orient that baseline. In a preferred embodiment, a baseline is identified using a technique for finding an axis for rotation described in the Signature Verification Disclosures.
- At a sub-step 172-4, the baseline is rotated and the optical image is rotated congruently with the baseline so that the optical image is oriented. In a preferred embodiment, the baseline is oriented to a preselected small angle from horizontal. A 1° angle is preferred, but a 0.5° angle, a 1.5° angle, or some other small angle would work as well.
- At a sub-step 172-4, an operator may thereafter "touch-up" the image using an application program for manipulating image files, such as the "Photoshop" application program noted above. In a preferred embodiment, this touch-up sub-step involves removing spot artifacts of printing, thinning excessively thick lines, and other touch-up functions.
- At a sub-step 172-5, marker information, is added to the image, in the form of pixels which are inverted from their original values in the image. In a preferred embodiment, the marker information comprises a predetermined set of isolated pixels whose values are exclusive-OR-ed (XOR-ed) with a selected set of information bits.

In a predetermined embodiment, the marker information includes confirming information about the seal and about the system on which the seal was registered, such as a date and timestamp, a serial number for the seal, and an identifier of the physical location the seal was scanned and registered. The marker information also includes a key which is responsive to signature features determined, as shown in the Signature Verification Disclosures, responsive to a handwritten signature given by an owner of the seal.

At a step 173, the processor 120 encrypts the optical image of the seal 131 with the key for encryption. In a preferred embodiment, the key for encryption is a 56-bit key for the Data Encryption Standard ("DES") encryption technique. DES is a symmetrical encryption technique, so the key for decryption is the same as the key for encryption. DES is known in the art of encryption. However, in alternative embodiments, other encryption techniques would be equally workable. For example, a 40-bit key for DES would also be workable. For another example, a asymmetrical encryption technique, such as a public key cryptosystem, would also be workable. Public key cryptosystems are known in the art of encryption.

At a step 174, the processor 120 records the encrypted optical image of the seal 131 using the database 140.

SECURE RETRIEVAL OF APPLIED SEALS

Figure 2:
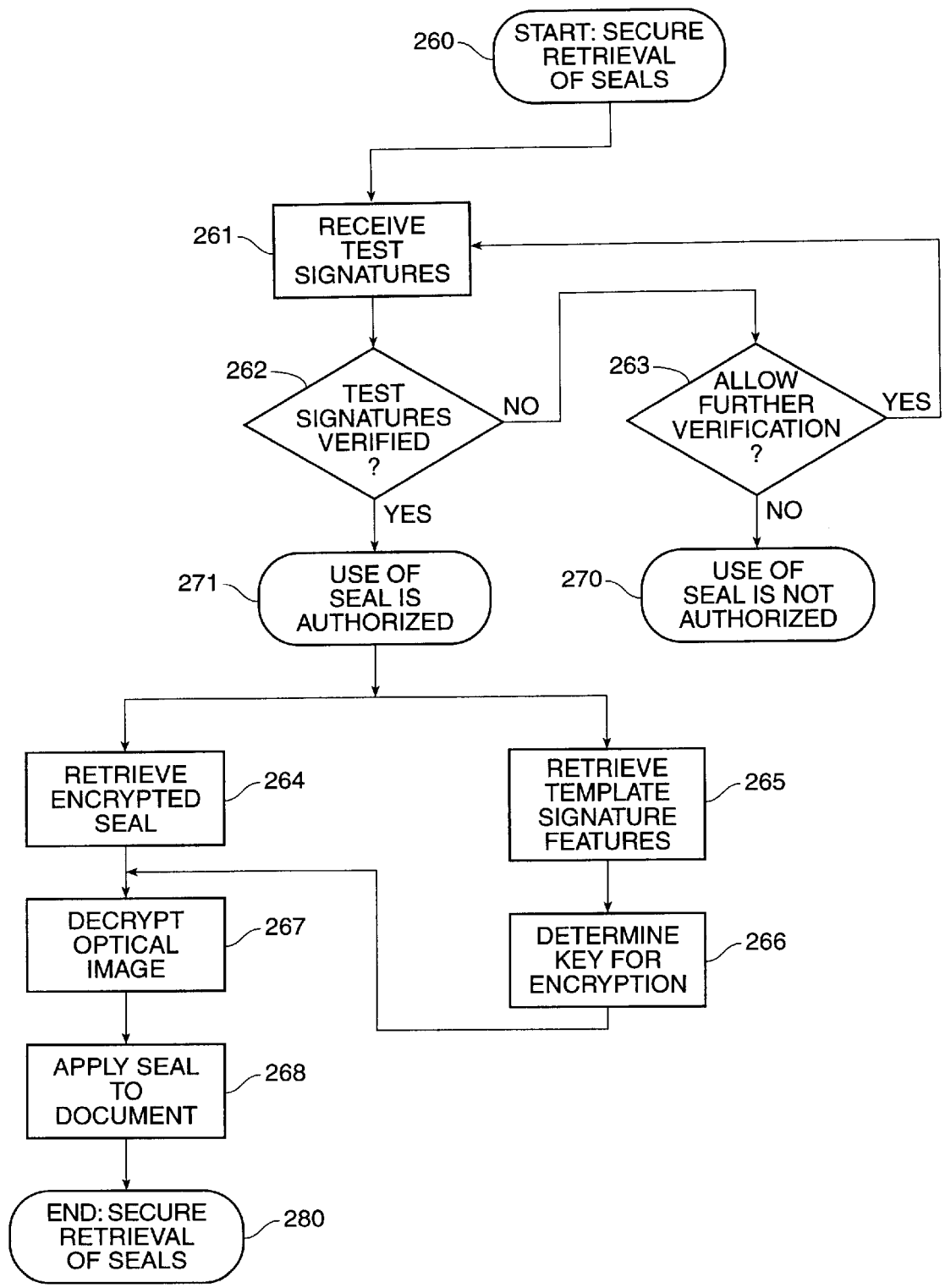
FIG. 2 shows a flow diagram of a method of secure retrieval of applied seals.

FIG. 2 shows a flow diagram of a method of secure retrieval of applied seals.

The system 100 for secure application of seals is used for secure retrieval of applied seals, except that there is no requirement for the scanner 130. However, in alternative embodiments, a second such system 100 (with or without the scanner 130) may be used for retrieval of applied seals. In such alternative embodiments, there is no special requirement that the physical hardware used by the second system 100 must be the same or even similar to the first system 100, only that (1) the test signatures 111 be received and processed using approximately the same resolution as the template signatures 111, (2) the processor 120 implements the same technique for determining features of the test signatures 111, and (3) the database 140 having the signature features for the template signatures 111 must be accessible to the processor 120 for the second system 100.

A method 250 is conducted by the second system 200. At a flow point 260 for the method 250, one or more authorized persons desire to apply an optical image of a seal to a document.

At a step 261, the second system 200 receives one or more test signatures 111, and attempts to verify those test signatures 111. In a preferred embodiment, this step 261 is performed using verification techniques described in the Signature Verification Disclosures.

In a preferred embodiment, the step 261 is performed by the processor 120 for the second system 200. However, in alternative embodiments, the step 261 may be performed by the processor 120 for the first system 100, in response to a request from the second system 200, may be performed by hardware which has the specialized purpose of signature verification, or may be performed by some combination of the first system 100, the second system 200, and specialized hardware.

As noted with regard to the step 161 and the table 1-1, the number and identity of the persons required to authorize application of the optical image of the seal may be specified separately for each seal and for each document.

At a step 262, the processor 120 determines whether the test signatures 111 were verified. If the test signatures 111 were not verified (i.e., they are not genuine), the method 250 continues with the step 263. If the test signatures 111 were verified (i.e., they are genuine), the method 250 continues with the step 264.

At a step 263, the processor 120 determines whether to allow further verification. In a preferred embodiment, a predetermined number of attempts (preferably up to three attempts) to verify test signatures 111 are allowed, after which the test signature 111 is rejected and authorization is denied. In alternative embodiments, authorization might proceed by a secondary path, such as authorization by an official who can determine that the person is actually authorized despite the failure to verify any test signatures 111. If further verification is allowed, the method 250 records the results of the most recent attempt at verification continues with the step 261. If further verification is not allowed, the method 250 ends at the flow point 270.

After the step 263 the method 250 arrives at a flow point 271. At the flow point 271, the method 250 has determined that use of the optical image of the seal 131 is authorized, and proceeds to apply the optical image of the seal 131 to the document.

From the flow point 271, the method 250 performs the step 264 in parallel with the steps 265 and 266.

At a step 264, the processor 120 retrieves the encrypted seal from the database 140.

At a step 265, the processor 120 retrieves the template signature features from the database 140.

At a step 266, the processor 120 determines the key for decryption using the template signature features from the database 140.

After the steps 264 and 266, the processor 120 performs the step 267.

At a step 267, the processor 120 decrypts the optical image for the seal 131 using the key for decryption.

In a predetermined embodiment, the processor 120 compares the marker information included in the encrypted seal with information supplied at the time of decryption, so as to further verify the individual using the seal. For example, the individual using the seal might be required to supply additional information, such as an account number, a PIN or other password, or their mother's maiden name.

At a step 268, the processor 120 applies the seal to the document. To perform this step 268, the processor 120 performs the following sub-steps:

At a sub-step 268-1, a selected region of the document where the seal is to be applied is rendered as a set of pixels.

At a sub-step 268-2, the optical image of the seal is rendered as a set of pixels.

At a sub-step 268-3, each pixel of the selected region of the document is combined with a corresponding pixel of the seal, to generate a combined pixel, and the document pixel is replaced with the combined pixel. In a preferred embodiment, the combined pixel is the logical XOR (logical exclusive OR) of the document pixel and the seal pixel. Alternatively, the combined pixel may be the logical OR of the two pixels, the logical AND of the two pixels, or some other function of the two pixels.

In alternative embodiments, the processor 120 may also add further data to the optical image of the seal when applying the seal to the document, such as (1) a timestamp, or (2) an identifier for the authorized persons who caused the seal to be applied, if there was more than one set of authorized persons who could have done so.

Alternative Embodiments

Although preferred embodiments are disclosed herein, many variations are possible which remain within the concept, scope, and spirit of the invention, and these variations would become clear to those skilled in the art after perusal of this application.

We claim:

1. A method for secure application of a seal to a document, said method comprising the steps of
    recording an optical image of a seal in a memory;
    receiving template biometric data from at least one authorized person;
    generating a key for encryption generated in response to said template biometric data; and
    encrypting said optical image using said key for encryption.

2. A method as in claim 1, comprising the steps of
    receiving test biometric data from at least one person seeking access to said seal;
    generating a key for decryption responsive to said test biometric data; and
    decrypting said optical image using said key for decryption.

3. A method as in claim 1, comprising the steps of
    altering said optical image responsive to said template biometric data or said test biometric data to produce an authenticated seal image; and
    applying said authenticated seal image to said document.

4. A method as in claim 3, wherein said step of altering said optical image comprises the steps of
    determining a set of template feature values in response to said template biometric data;
    embedding a set of data bits responsive to said template feature values in said optical image.

5. A method as in claim 3, wherein said step of altering said optical image comprises the steps of
    determining a set of template feature values in response to said template biometric data;
    microprinting a set of symbols responsive to said template feature values.

6. A method as in claim 1, comprising the step of
    altering said optical image to conform to a region of said document reserved for said seal.

7. A method as in claim 1, wherein said template biometric data comprises a handwritten signature given by at least one authorized person.

8. A method as in claim 1, wherein said test biometric data comprises a handwritten signature given contemporaneously by the person seeking access.

9. A method as in claim 1, wherein said template biometric data comprises a facial image, a fingerprint, a hand image or handprint, a foot image or footprint, a set of human genome data, a retinal image, a voiceprint, or a recorded spoken statement.

10. A method as in claim 1, wherein said step of generating a key for encryption comprises the steps of
    determining a set of template feature values in response to said template biometric data; and
    determining a set of key bits in response to said template feature values.

11. A method as in claim 1, wherein said step of generating a key for decryption comprises the steps of
    determining a set of test feature values in response to said test biometric data; and
    determining a set of key bits in response to said test feature values.

* * * * *